United States Patent
Lim (10) Patent No.: US 7,489,336 B2
(45) Date of Patent: Feb. 10, 2009

(54) METHODS AND APPARATUS FOR DETECTING AND ADJUSTING OVER-SCANNED IMAGES

(75) Inventor: Ruth Ann Lim, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 642 days.

(21) Appl. No.: 11/173,778

(22) Filed: Jun. 30, 2005

(65) Prior Publication Data

US 2007/0002142 A1 Jan. 4, 2007

(51) Int. Cl.
  *H04N 7/01* (2006.01)
  *G06K 9/62* (2006.01)
(52) U.S. Cl. ...................... 348/181; 382/209
(58) Field of Classification Search ......... 348/180–182, 348/188, 189, 177; 382/209
  See application file for complete search history.

(56) References Cited

U.S. PATENT DOCUMENTS

| | | | | |
|---|---|---|---|---|
| 4,631,691 A | * | 12/1986 | Pica | 382/280 |
| 4,724,484 A | | 2/1988 | Ward | |
| 5,247,358 A | * | 9/1993 | Richards | 348/191 |
| 5,946,422 A | * | 8/1999 | Neff et al. | 382/278 |
| 5,982,930 A | * | 11/1999 | Neff et al. | 382/209 |
| 2005/0259092 A1 | * | 11/2005 | Aoki | 345/204 |
| 2006/0208980 A1 | * | 9/2006 | Okumura et al. | 345/87 |

OTHER PUBLICATIONS

[Online] Mar. 2004, XP002414797, Retrieved from the Internet: URL: http://download.nvidia.com/Windows/56.72/ForceWare_Release_55_Display_Properties_Users_Guide.v56.
[Online] Aug. 25, 2004, XP002414787 Retrieved from the Internet: URL: http://www.anandtech.com/multimedia/showdoc.aspx?i=2181>[retrieved on Jan. 15, 2007] p. 77.
[Online] Mar. 15, 2005, XP002414799 Retrieved from the Internet: URL: http://www-uxsup.csx.cam.ac.uk/pub/doc/suse/suse9.3/suselinux-adminguide_en/cha.x11.html>.

* cited by examiner

*Primary Examiner*—Paulos M Natnael (57) ABSTRACT

A method for adjusting images displayed on a television set, the television set being coupled to receive image information from an image-generating electronic device. The method includes displaying on the television set, using test image information from the image-generating electronic device, a test image. The method also includes receiving, from a human operator, user input. The method further includes employing the user input to form scaled test image information that corresponds to a scaled test image, the scaled test image representing a scaled version of the test image. The method yet also includes displaying on the television set, using the scaled test image information, the scaled test image on the television set in lieu of the test image.

29 Claims, 6 Drawing Sheets

METHODS AND APPARATUS FOR DETECTING AND ADJUSTING OVER-SCANNED IMAGES

BACKGROUND OF THE INVENTION

Advances in electronic technology combined with lowering cost have enabled electronic devices to proliferate and become ubiquitous. In recent years, a trend toward convergence among electronic devices has emerged as users perceive synergy among these devices. However, the convergence path has not been without its wrinkles, especially for computers and televisions.

Computers and televisions are two popular electronic devices that have developed in separate industries. As a result, dissimilarities in the standards have emerged between the two industries. One difference that has made convergence between computers and televisions especially challenging is the different scanning techniques employed to display images.

Traditionally, computers have been designed to display computer-generated text and graphic images on computer monitors. Images generated by computers typically employ standards that utilize an under-scanning protocol. As discussed herein, under-scanning refers to the process of manipulating the image source to allow the full image (i.e., all pixels of the image including the outermost edges of the image) to be displayed. Therefore, images shown on computer monitors do not appear cropped or truncated.

In contrast, televisions typically employ standards that utilize the over-scanning protocol. As discussed herein, over-scanning refers to the process of cropping the image source to hide the outside vertical and horizontal edges of the image in order to avoid showing the black border around the image. One way to achieve over-scanning is by enlarging the original source image to exceed the size of the viewable portion of the television set. Accordingly, the outside edges are not displayed and are essentially "hidden" from the user's viewing.

Generally speaking, an image may be divided into three parts: the action safe zone (the outer five percentage of the image edge), the title safe zone (the outer ten percentage of the image edge, including the action safe zone), and the display zone (the percentage of the image that does not include the action/title safe zones). The extent of over-scanning that may occur in each television may vary depending upon the specific manufacturers. Manufacturers typically hide the action safe zone and usually expand the image to also hide the title safe zone. Thus, the display zone is usually the part of the image that is shown on the television set.

It is believed that over-scanning first developed when sharp fluctuations in electrical voltages would cause the image displayed on the earlier television models to "jiggle" (i.e., to move back and forth in an unsteady manner). To enhance the viewer's experience, a percentage of the outer edges of the image is hidden from the user's view; thus, the image that is displayed on the television set appears stable.

Consider the situation wherein, for example, a director of a movie has to make sure that actions that may be relevant to the story line are not accidentally cropped due to over-scanning. An image generated to be displayed specifically on television sets typically takes into account the over-scanning by the monitor that may occur. As a consequence, the image's creator tends to keep the relevant part of the image within the aforementioned display zone to ensure that the relevant part is not cropped when displayed on a television set.

In addition to the scanning protocol differences, the connectors that link computers to the monitors may also affect the way computer-generated text and graphic images are displayed. A computer-to-monitor connector may be a digital connector, e.g., video graphic array (VGA) connector or display video interface (DVI) connector, or an analog connector, e.g., composite connector, S-video connector, and component connector.

Digital connectors are bi-directional connectors that may have extended display identification data (EDID) capabilities. As discussed herein, the EDID capability refers to the ability of the monitor to furnish display-related data to the computer, and the computer's ability to receive and use such display-related data to optimize the display of images thereon. EDID information may include, for example, the specification of the attached monitor, the manufacturer's name, the display size, the pixel mapping data, the display product type, and the like.

Theoretically, computers should be able to interpret the EDID information to adjust the image as needed. However, the EDID information gathered from a television (connected via a DVI connector for example) may differ from the EDID information gathered from a computer monitor (connected via a VGA connector for example). In some cases, for example, the EDID information gathered from a television may not be in a format that is not readable by the computer. In other cases, the EDID information gathered for a television set may lack certain critical details needed to optimize the display of images thereon. Consequently, computers tend to have difficulties employing the EDID information gathered from television sets to adjust for the over-scanning that may have been performed by the television sets.

Analog connectors are uni-directional connectors (i.e., connectors that only transmit data from computers to monitors). Since no data about the monitor is transmitted back to the computer, the computer is unable to determine the monitor's display capabilities. Since both composite video and S-video connectors are analog connectors commonly used with television sets, some video graphic card manufacturers have modified their video cards to include built-in hardware to reduce the amount of over-scanning that may occur (e.g., by intentionally under-scanning the image to take into account the subsequent over-scanning by the television set). In many cases, however, the video cards may not be able to adjust for all of the over-scanning that may be performed by the television set. Thus, the image may still appear partially truncated when displayed on a television set.

The problem with over-scanning is further exacerbated when a computer is connected to a television using a component connector. Component connectors are connectors that enable the transmission of high-definition signal. As discussed herein, high-definition signals are signals that provide a higher resolution in comparison with analog signals currently employed for television broadcasts (USA as of 2005). High definition television signals, as the term is employed herein, represent signals associated with any of the competing and/or emerging HDTV protocols currently being proposed in the industry (USA as of 2005).

Component connectors are fairly new in comparison to the other types of analog connectors; thus, many video graphic card manufacturers have not fully modified their video cards to handle the over-scanning that may occur in television sets that may be connected to the computer systems via component connectors. When a television set is connected to a computer via a component connector, the computer may not, as a consequence, be able to compensate for over-scanning without user intervention.

When a computer is connected to a television set, a user may manually adjust the image for over-scanning by launching a display property panel and reconfiguring the video driver using the display property panel. However, few users have the knowledge or skill to perform this task. Further, since part of the image (such as the computer task bar) may have been truncated on the television screen due to over scanning, the user may have difficulties launching the program that will provide the display property panel.

Considering that a computer may not always be capable of identifying the type of monitor that is connected to the end of the connector, some computers may pre-set their video cards to automatically assume a specific type of monitor (i.e., either a computer monitor or a television set). However, the preset parameters employed for presetting the computer's video monitor may differ from the specifications of the television set or of the computer monitor actually connected to the computer. Accordingly, the image displayed may still contain a significant amount of distortion and/or may still be partially truncated. In some extreme cases, the computer's video display card may interpret the differences as an error condition. The result is a blank screen since the computer's display card may be configured to not display any image signal that may cause damage to the attached display device (e.g., monitor or television set).

Another method that may be implemented to correct for over-scanning involves the addition of a toggle switch, which allows a user to alternate between a television and a computer monitor mode. However, users who are reluctant to read instructions may be oblivious to the purpose of the toggle switch. Further, such an approach represents an inelegant solution to the problem and increases the hardware cost. Consequently, the toggle switch approach has not been widely adopted by manufacturers.

SUMMARY OF INVENTION

The invention relates, in an embodiment, to a method for adjusting images displayed on a television set. The television set is coupled to receive image information from an image-generating electronic device. The method includes displaying on the television set, using test image information from the image-generating electronic device, a test image. The method also includes receiving, from a human operator, user input. The method further includes employing the user input to form scaled test image information that corresponds to a scaled test image. The scaled test image represents a scaled version of the test image. The method yet also includes displaying on the television set, using the scaled test image information, the scaled test image on the television set in lieu of the test image.

In another embodiment, the invention relates to an article of manufacture comprising a program storage medium having computer readable code embodied therein. The computer readable code is configured for adjusting images displayed on a television set that is coupled to receive image information from an image-generating electronic device. The article includes a computer readable code for displaying on the television set, using test image information from the image-generating electronic device, a test image. The article also includes a computer readable code for receiving, from a human operator, user input. The article further includes a computer readable code for employing the user input to form scaled test image information that corresponds to a scaled test image. The scaled test image represents a scaled version of the test image. The article yet also includes a computer readable code for displaying on the television set, using the scaled test image information, the scaled test image on the television set in lieu of the test image.

In yet another embodiment, the invention relates to an arrangement for adjusting images displayed on a television set. The television set is coupled to receive image information from an image-generating electronic device. The arrangement includes means for generating test image information, the test image information being configured for display on the television set as a test image. The arrangement also includes means for receiving, from a human operator, user input. The arrangement further includes means for employing the user input to form scaled test image information that corresponds to a scaled test image. The scaled test image represents a scaled version of the test image. The arrangement yet also includes means for generating scaled test image information, the scaled test information being configured for display on the television set as the scaled test image in lieu of the test image.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

In accordance with embodiments of the present invention, there are provided methods and apparatus for implementing user-initiated video property adjustment (UIVPA) in order to permit a computer user to ascertain whether the displayed image suffers from over-scanning and to permit the computer user to adjust the image displayed on a television screen to correct the television set's over-scanning. Generally speaking, the image is generated from analog or digital data provided by an image-generating electronic device, which may represent for example a computer (such as one executing under the Microsoft Windows™ operating system platform). The image-generating electronic device may be coupled to the television set via an appropriate connector (e.g., component connector, DVI connector, and the like). The television set may represent, but is not limited to, an analog television set or a digital television set. The digital television set may include, but is not limited to, an HDTV television set implementing, for example, a 480i, a 480i, a 720i, or a 1080i HDTV standard.

Since the television set's over-scanning may make it difficult to invoke the UIVPA (due to, for example, screen blanking out, failure to display the task bar), embodiments of the invention implement various approaches to invoking the UIVPA in conjunction with, or independent of, the operating system. These approached are discussed later in this document.

In an embodiment, a UIVPA user interface may display, on a television set, directions to a user pertaining to the adjustments needed to substantially eliminate image over-scanning. The adjustment value obtained via the UIVPA from the user may be utilized to adjust and/or reduce the amount of over-scanning in the displayed image and in the images to be displayed.

Consider the situation wherein, for example, a typical user connects an image-generating device to a television set instead of to a computer monitor. As discussed, the television set may not have the ability to furnish display-related data (such as type of display, display model, and the like) to the image-generating electronic device. The failure may be due to, for example, the use of a component connector to connect the television set to the image-generating electronic device. In this situation, the image-generating electronic device may not be able to automatically adjust the image to account for the television set's over-scanning.

Without the ability to automatically adjust the image prior to displaying the images on the television set, the displayed image may appear cropped on the television screen. The situation may result in user frustration, particularly since the average user typically does not have sufficient technical knowledge to correct the over-scanning on his own. With the UIVPA of the present invention, the user is provided with a computer-implemented mechanism (e.g., a computer-generated user interface) to enable the user to adjust, in a user-friendly and highly intuitive manner, for the over-scanning, along with instructions on how to perform the adjustments via the UIVPA.

In an embodiment, after a television set is connected to an image-generating electronic device, a UIVPA user interface is automatically displayed on the television set to enable the user to determine whether over-scanning has occurred and to prompt the user to enter parameters, if needed, to adjust for the over-scanning. The UIVPA user interface may include, but is not limited to, a test image that may include a reduced replica image and an input arrangement (such as a dialog box) to solicit the user to enter adjustment values for adjusting for any over-scanning.

The image intended to be displayed (i.e., the test image) preferably represents an image that substantially fills or completely fills the television screen when properly displayed and includes details in the vicinity of the image's edges that would give clues as to whether the image has been cropped due to over-scanning (i.e., a portion of the edge details would be hidden). If the test image is a blank, uniformly blue background image, for example, there would be little clue provided if a part of the image is cropped around the edges due to over-scanning. However, if the image intended to be displayed is, for example, a block of human-readable text that is intended to fill the entire television screen when properly displayed, any missing words that should have appeared in context near the image's edge(s) would provide a clue to the user that some cropping has occurred.

In an embodiment, a reduced replica image is employed to assist in the detection of over-scanning. The reduced replica image represents a smaller copy of the test image intended to be displayed on the television screen. This reduced replica is displayed, in an embodiment, in the display zone of the television set to ensure that the entire reduced replica image can be displayed irrespective whether over-scanning exists. By comparing the edge details of the image being displayed on the television screen against the edge details of its reduced replica, the user may readily determine whether the image being displayed on the television screen has been cropped due to over-scanning. The comparison may also provide some information regarding how much of the test has been cropped due to over-scanning. With this knowledge, the user may be able to enter more appropriate adjustment values to adjust for the over-scanning.

In an embodiment, the actual image displayed on the television screen is adjusted substantially immediately (e.g., without having to reboot the computer or within less than a second, for example) as adjustment values are inputted by the user. The user may then compare the newly adjusted image on the screen against the reduced replica of the image intended to be displayed to decide whether an additional adjustment is needed to correct for over-scanning.

The UIVPA facility may be launched at different times with respect to the loading of the main operating system of an image-generating electronic device. As discussed herein, the main operating system may represent, but is not limited to, an operating system from the Microsoft™ Window platform, a Linux or Mac OS™ operating system, a UNIX operating system, or any other operating system employed to control computer system operation. In an embodiment, the UIVPA facility may be available prior to, during, and/or after the loading of the main operating system.

In an embodiment, a UIVPA software may be launched prior to the initial loading of the main operating system on the image-generating electronic device. In this case, the UIVPA software may be launched from, for example, code stored in the BIOS. In an embodiment, the BIOS splash screen may be replaced by a test screen configured to allow the user to ascertain whether over-scanning has occurred. If over-scanning has occurred, user inputs may be received and adjustments may be made prior to the loading of the main operating system. Alternatively, the UIVPA software may be executed under the control of an alternate operating system that may be booted up prior to the loading of the main operating system.

In an embodiment, the UIVPA software may be launched during the initial loading of the main operating system. Since the UIVPA is launched under control of the main operating system during the initial loading of the main operating system, the UIVPA software may be integrated into the main operating system code. In an embodiment, the video driver of the main operating system may be employed to display the test screen and to adjust the displayed test screen based on adjustment parameters inputted by the user.

In an embodiment, the UIVPA software represents an executable program loaded and executed after the loading of the main operating system. In an embodiment, the test screen provided by the UIVPA software represents a wallpaper image, i.e., a graphic representation that forms the background of an operating system. On this background, icons, menus, and other elements may be displayed. Since the wallpaper may be interactive, the UIVPA user interface may be embedded as a wallpaper element to acquire inputs from a user to adjust for over-scanning. In another embodiment, the UIVPA user interface may take the form of a dialog box and may be launched after the initial booting of the main operating system to acquire user-inputted adjustment values for over-scan adjustment.

Figure 1:
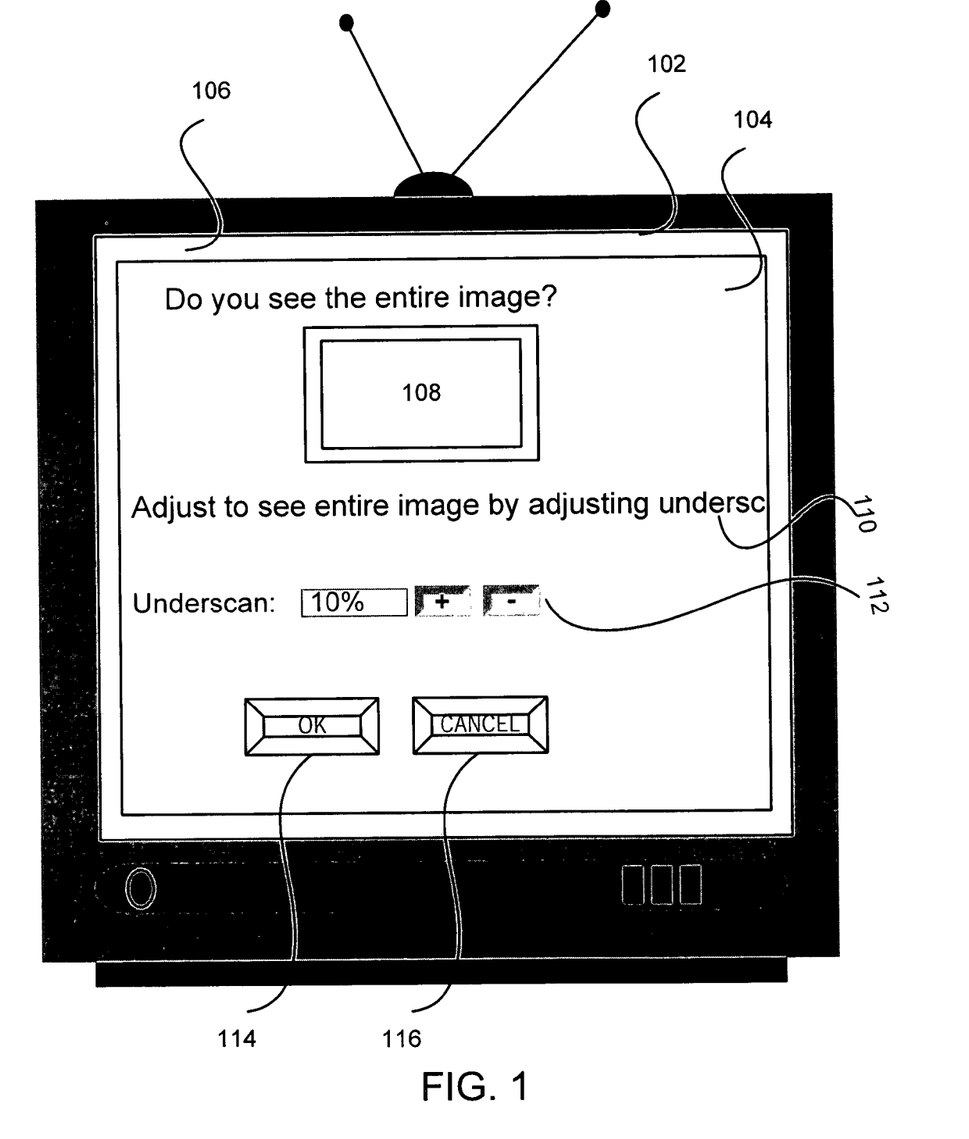
FIG. 1 illustrates, in an embodiment of the present invention, a simple example of a UIVPA user interface that may be employed to enable a user to ascertain whether over-scanning has occurred.

The features and advantages of embodiments of the invention may be better understood with reference to the figures and discussions that follow. FIG. 1 illustrates, in accordance with an embodiment of the present invention, a simple example of a UIVPA user interface that may be employed to enable a user to ascertain whether over-scanning has occurred. The UIVPA user interface may also be employed to acquire, if necessary, user inputs from the user to adjust an image displayed on a television set for over-scanning.

As shown in FIG. 1, a test image 102 from an image-generating electronic device is displayed on a television set. The test image 102 is displayed using image information generated by the image-generating electronic device. The part of test image 102 that is shown to the user is a viewable test image 104. The part of test image 102 that is hidden to the user is in a title safe zone 106.

As part of the UIVPA user interface, a reduced replica image 108 of test image 102 is shown. If viewable test image 104 does not match reduced replica image 108, particularly with respect to details at the edges of viewable test image 104 and replica image 108, then over-scanning may have occurred.

In the example of FIG. 1, test image 102 represents a test image that, if over-scanned, may be readily perceived as cropped to the user based on the context. For example, instruction 110 is truncated and is an incomplete sentence in the example of FIG. 1. Thus, the user may readily perceive that a part of instruction 110 has been truncated and thus a part of test image 102 has been cropped even without consulting the reduced replica image 108. If the user wishes to confirm, the user may compare the viewable test image 104 against reduced replica image 108 in the manner discussed to discover whether over-scanning has occurred.

In the example of FIG. 1, over-scanning is deemed to have occurred. The human operator may then enter, as user input, adjustment value 112. In an embodiment, the adjustment value (e.g., "underscan" parameter value in the example of FIG. 1) may be entered by clicking on either the "+" or "−" button or by directly typing in the adjustment value. In an embodiment, as the adjustment value is entered, viewable test image 104 is adjusted substantially immediately using the inputted adjustment value 112. For example, the image-generating electronic device may scale the test image information (based on which the test image is generated) so that the result is scaled test image information that can be employed by the television set to display the scaled test image (i.e., a scaled version of the test image that has been scaled, or adjusted in size, using the user input). Based on the newly adjusted viewable test image, the user may accept (by clicking on OK button 114) or reject (by clicking on Cancel button 116) the result or may enter other input values to rescale the image again. In other words, the user may continue to adjust the image on the television set until the user indicates, via some user input (such as clicking on the OK button or some hot key sequence), that the user is satisfied with the displayed scaled test image. The final user input value that is employed to scale the last displayed image prior to user acceptance is then stored for use in scaling subsequent images prior to displaying them on the television set.

In an embodiment, the UIVPA is launched automatically, i.e., without user prompting. This is because many users may not even be aware of the facility to adjust the image, or the image may be too over-scanned to enable the user to invoke the UIVPA manually (e.g., in the case where user invocation of the UIVPA may require the user to click on an area hidden due to over-scanning). By automatically providing the UIVPA, the user is given the opportunity to adjust for over-scanning. In an embodiment, the UIVPA is automatically invoked when the image-generating electronic device detects that it is connected to a television set (analog, digital and/or HDTV).

As mentioned, the UIVPA user interface may be launched prior to the initial loading of the main operating system, during the initial loading of the main operating system, or after the initial loading of a main operating system. In the following figures, various implementations are discussed. However, these implementations should be considered as examples and not limiting of the true scope of the invention.

Figure 2A:
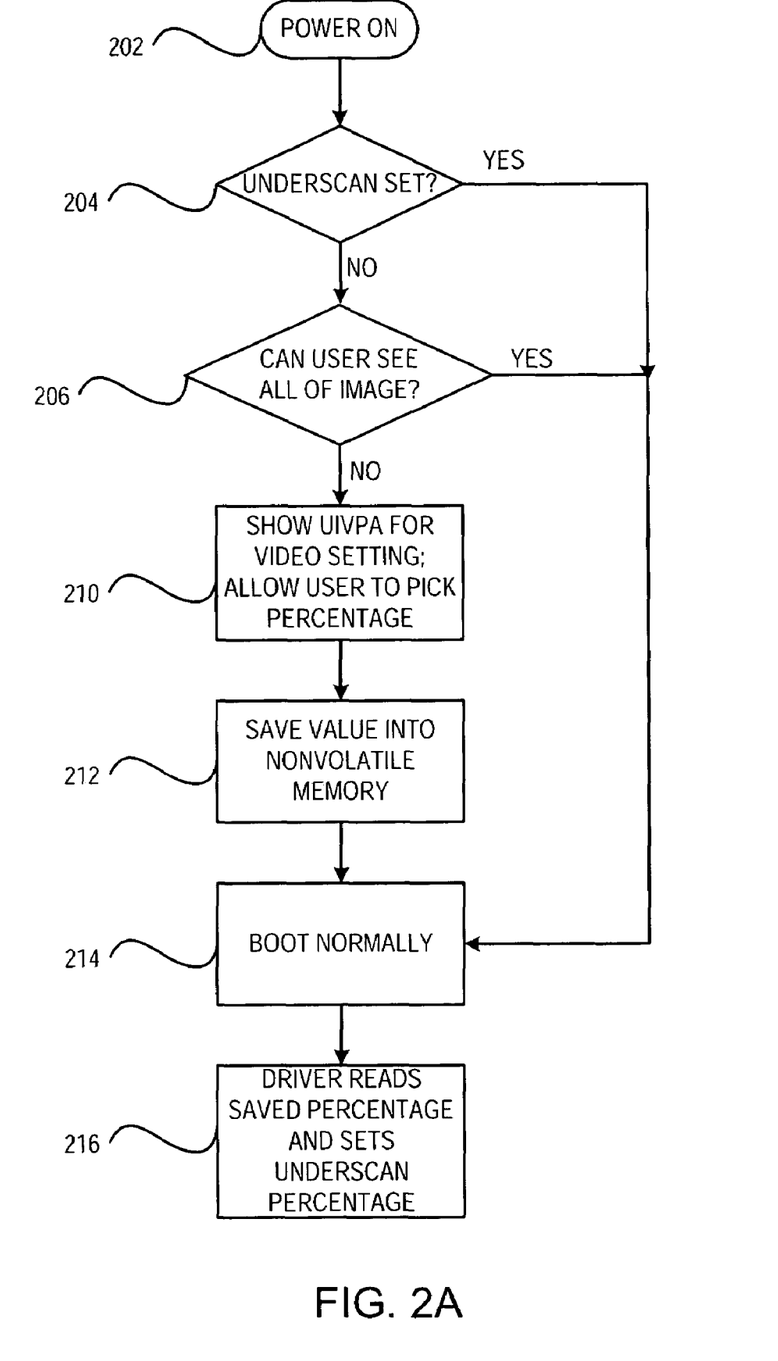
FIG. 2A represents, in an embodiment of the present invention, a flowchart illustrating the use of the UIVPA arrangement to allow the user to ascertain whether over-scanning has occurred and to correct for over-scanning using user-inputted adjustment values.

In an embodiment, the UIVPA software is employed to enhance the user's "out-of-box experience" (OOBE). As discussed herein, OOBE refers to the user's experience during the initial setup of a computer, which includes the setup of the computer display device. FIG. 2A represents, in accordance with an embodiment of the present invention, a flowchart illustrating the use of the UIVPA arrangement to allow the user to ascertain whether over-scanning has occurred and to correct for over-scanning using user-inputted adjustment values. After an image-generating electronic device and a television set have been connected and powered on (step 202), the computer system's built-in code (e.g., BIOS or Basic Input/Output System) checks the image-generating electronic device for under-scan parameters that may have been pre-configured for the system (204). As discussed herein, BIOS (Basic Input/Output System) is an example of the computer system's built-in code that controls the computer system during the initial boot-up phase prior to the loading of an operating system.

If under-scan has not been performed (204) based on preset parameters, steps are undertaken to correct for any over-scanning (steps 206, 210, and 212). Thus, in step 206, the user may be asked if the entire test image is viewable (i.e., whether the user perceives any cropping of the test image). As mentioned, the user may be able to ascertain whether cropping of the test image has occurred based on the context of the image or based on a comparison between the viewable portion of the test image and a reduced replica image.

If the test image has been cropped, over-scanning is deemed to have occurred. In this case, the UIVPA user interface portion for receiving the user input values is displayed (step 210) and the user is able to input the percentage of under-scan needed to correctly compensate for the over-scanning (step 210). I In an embodiment, the viewable portion of the test image is adjusted substantially immediately after the user inputs the adjustment value. This substantially immediate feedback permits the user to rapidly adjust the image for over-scanning based on a trial-and-error approach.

In some computer systems, the BIOS may have limited memory space. Accordingly, it may not be desirable to use this limited BIOS memory space to implement the real-time feedback feature. In an embodiment, a UIVPA test image may be shown in which various versions of an image are displayed simultaneously, with each version being associated with a different under-scan value. The user is asked to identify which version of the viewable test images is not cropped or over-scanned. This approach allows the user to specify the amount of under-scanning without having to implement the real-time feedback feature.

In another embodiment, an embedded graphic UIVPA replaces the BIOS splash screen. An embedded graphic UIVPA may provide a more complex and user-friendly user interface at the expense of additional firmware space.

Referring back to FIG. 2A, the inputted adjustment value may be saved into non-volatile memory (e.g., the desktop management interface (DMI) table or non-volatile RAM/ROM) for use after the initial loading of the main operating system. The boot up process continues normally (step 214). Once the boot up process has completed, the video driver of the operating system (OS) may retrieve the saved adjustment value from non-volatile memory and use that adjustment value for the display of images on the television set (step 216).

On the other hand, if under-scan has been set (step 204) or if no image cropping due to over-scanning has occurred (step 206), no adjustment may be necessary, and the process boots as normal without soliciting from the user the adjustment value (direct path from step 204 to step 214 or direct path from step 206 to step 214). After booting normally in step 214, the preset underscan value, if any, may be retrieved by the OS's video driver for subsequent control of image display. In an alternate embodiment, the test in step 204 may be omitted and the user is asked to determine whether over-scanning has occurred irrespective of whether under-scanning has been preset. In this manner, the user is able to adjust the test image based on inputted adjustment values irrespective whether there is preset under-scanning.

In another embodiment, the UIVPA software may be launched under control of a different operating system that may be launched from a separate partition on the hard drive. In the example flow chart of FIG. 2B, after an image-generating electronic device and a television set have been connected and powered on (step 250), the BIOS may boot the alternate operating system from a separate partition on the hard drive. Under the control of the alternate operating system, the UIVPA software may be launched.

The alternate operating system and the main operating main operating system may be using the same type of operating systems, for example the Microsoft™ Windows platform. Alternatively, the two operating systems may represent different operating systems. For example, the main operating system may be based on the Microsoft™ Windows platform, whereas the alternate operating system may be based on a Linux platform.

Figure 2B:
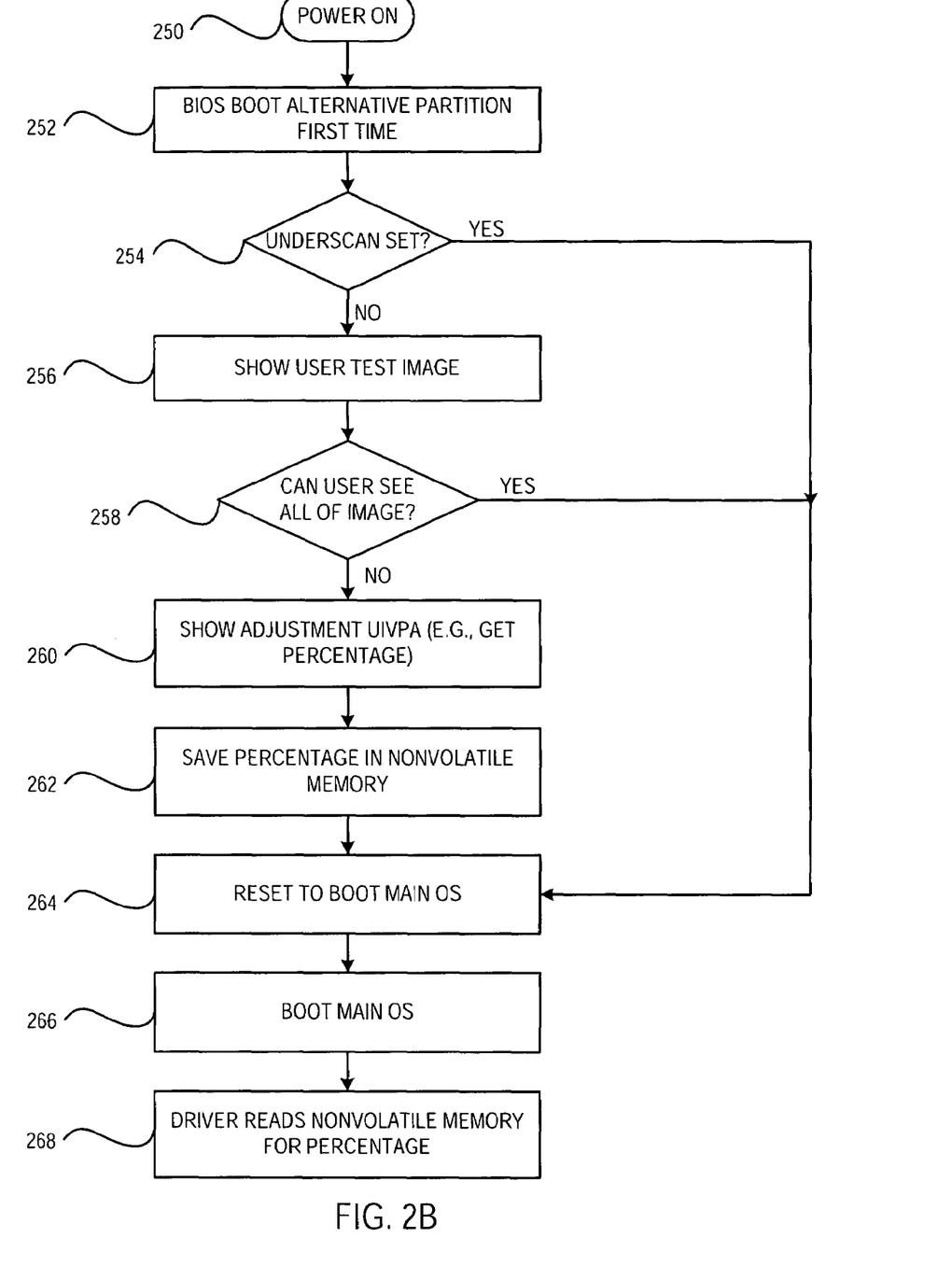
FIG. 2B represents, in an embodiment of the present invention, a flowchart illustrating the use of a UIVPA software launched under control of a different operating system which may be launched from a separate partition on the hard drive.

At step 254, the BIOS check the image-generating electronic device for under-scan parameters that may have been pre-configured for the system. If under-scan has already been performed and set by the manufacturer, the image-generating electronic device may be reset to boot up from the main operating system (264). However, if under-scan has not been performed, steps are then undertaken to permit the user to correct for any perceived over-scanning.

In an embodiment, the user is shown a reduced replica image (step 256). If the current viewable test image (which may represent, in an embodiment, the desktop image) matches the reduced replica image (step 258), no further adjustment is needed. In this case, the image-generating electronic device is reset to boot from the main operating system (264).

However, if the current viewable test image does not match the reduced replica image (step 258), then over-scanning is deemed to have occurred. At step 260, the UIVPA user interface solicits from the user an adjustment value appropriate for correcting the over-scanning. At step 262, the adjustment value (representing an under-scan percentage in an embodiment) is saved into non-volatile memory for subsequent use (step 262).

Once the adjustment value has been saved, the image-generating electronic device is reset to boot from the main operating system (step 264). The boot up process continues normally (step 266) by completing the loading of the main operating system. Once the boot up process has completed, the main OS's video driver retrieves the adjustment value saved in the non-volatile memory at step 262 to adjust for over-scanning while displaying images on the television screen (step 268).

Figure 3:
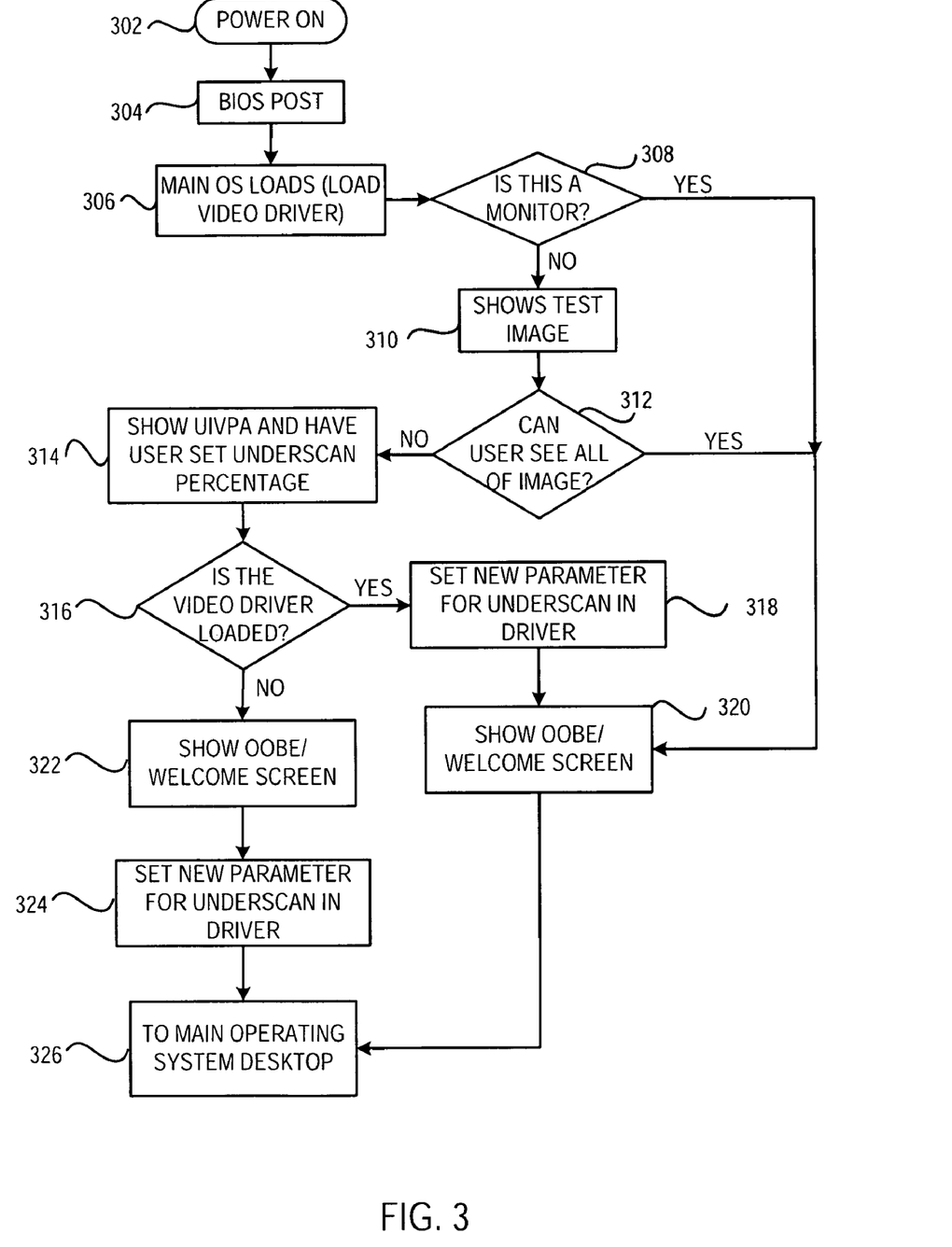
FIG. 3 shows, in an embodiment of the present invention, a flowchart illustrating the use of a UIVPA arrangement during main OS loading to allow the user to ascertain whether over-scanning has occurred and to correct for over-scanning using user-inputted adjustment values.

The UIVPA software may also be launched during the loading of the main operating system. FIG. 3 shows, in accordance with an embodiment of the present invention, a flowchart illustrating the use of a UIVPA arrangement during main OS loading to allow the user to ascertain whether over-scanning has occurred and to correct for over-scanning using user-inputted adjustment values.

After an image-generating electronic device and a display device have been connected and powered on (step 302), the BIOS proceeds as normal (step 304) to load the main operating system and the video driver (step 306). At step 308, the BIOS checks to determine the type of external display output device (EDOD) currently connected to the image-generating electronic device. If the EDOD is a computer monitor (step 308), then the OOBE welcome screen is displayed (step 320) and control is passed to the main OS's desktop (326).

However, if the EDOD is not a computer monitor (step 308), additional steps may be taken to adjust for over-scanning may be undertaken if necessary. If the EDOD is not a computer monitor as ascertained in step 308, a reduced replica image is shown (step 310). If the current viewable test image (which may represent, in an embodiment, the current desktop image) matches the reduced replica image (step 312), no adjustment for over-scanning is required. In this case, the method of FIG. 3 proceeds to step 320 to display the OOBE welcome screen and to pass control to the OS's desktop (326).

However if the current desktop image does not match the reduced replica image (step 312), then over-scanning is deemed to have occurred. At step 314, the UIVPA user interface solicits from the user an adjustment value appropriate for correcting the over-scanning. If the video driver has been fully loaded (step 316), then the main operating system is able to provide the user with an immediate feedback of the adjustment that has been made (step 318) by setting the video driver with the new parameters. Once the user is satisfied with the adjustment, the method of FIG. 3 proceeds to step 320 to display the OOBE welcome screen and to pass control to the OS's desktop (326).

However, if the video driver has not been fully loaded, then the adjustment value entered by the user is saved into non-volatile memory. At step 322, the OOBE welcome screen is displayed and the video driver, after being fully loaded, retrieves the parameters saved in the non-volatile memory to adjust the image (step 324). At step 326, control is passed to the OS's desktop (326).

Figure 4A:
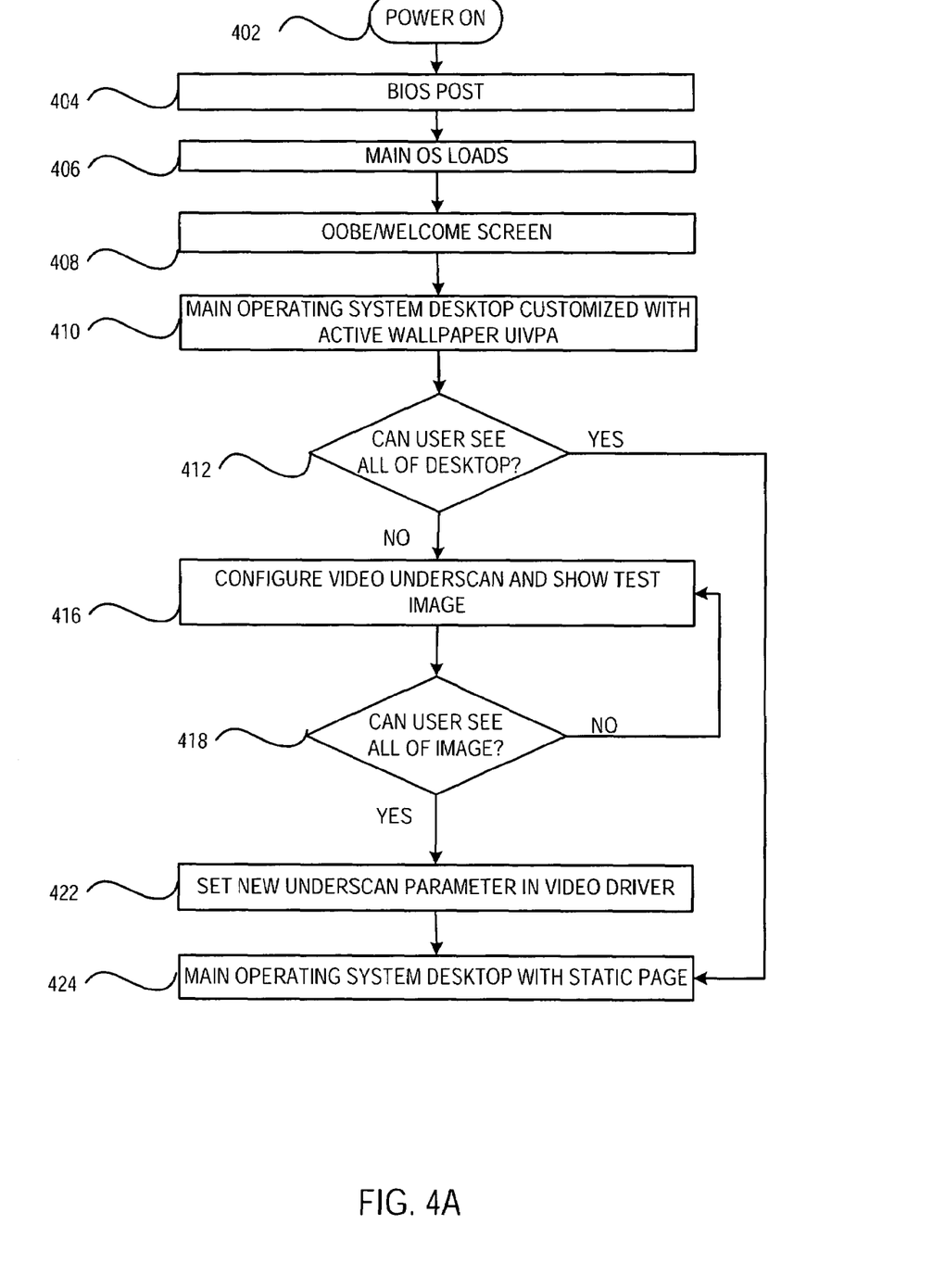
FIG. 4A shows, in an embodiment of the present invention, a flowchart illustrating the steps of acquiring user inputs through a UIVPA arrangement after the initial loading of the main operating system.

The UIVPA software may also be launched after the loading of the main operating system. FIG. 4A shows, in accordance with an embodiment of the present invention, a flowchart illustrating the steps of acquiring user inputs through a UIVPA arrangement after the initial loading of the main operating system. After an image-generating electronic device and a television set have been connected and powered on (step 402), the BIOS proceeds as normal (step 404) to load the main operating system and the video driver (step 406). After the operating system has been loaded, the OOBE welcome screen is displayed (step 408).

In an embodiment, the main operating desktop is displayed with customized active wallpaper acting as the UIVPA (step 410). For example, the Microsoft™ Window operating platform, among others, provides the ability to display the main operating desktop as an active wallpaper after OOBE. By embedding the UIVPA code as part of the wallpaper code, an interactive interface may be made readily available to the user for over-scan adjustment. The user is now able to employ the active wallpaper as an interface to adjust the image for any over-scanning that may have occurred.

If at step 412, the user is able to see the entire window desktop, the UIVPA code is closed (step 424) and a window desktop with a static wallpaper may replace the active wallpaper. However, if the user is unable to see the entire desktop at step 412, the user may employ the active wallpaper UIVPA to reconfigure the video driver (step 416). Immediate feedback on the adjustment is provided, enabling the user to continue making adjustments until the image has been corrected for over-scanning (steps 418/416). In an embodiment, the active wallpaper UIVPA may launch a more complex visual guide, such as a video driver setup wizard, that may direct the user through the process of adjusting the video driver to compensate for over-scanning.

Once the user has completed the adjustment process, the video driver is set with the new under-scan parameters (step 422). Subsequently, the static wallpaper for the main operating system desktop may the active wallpaper UIVPA (424).

Figure 4B:
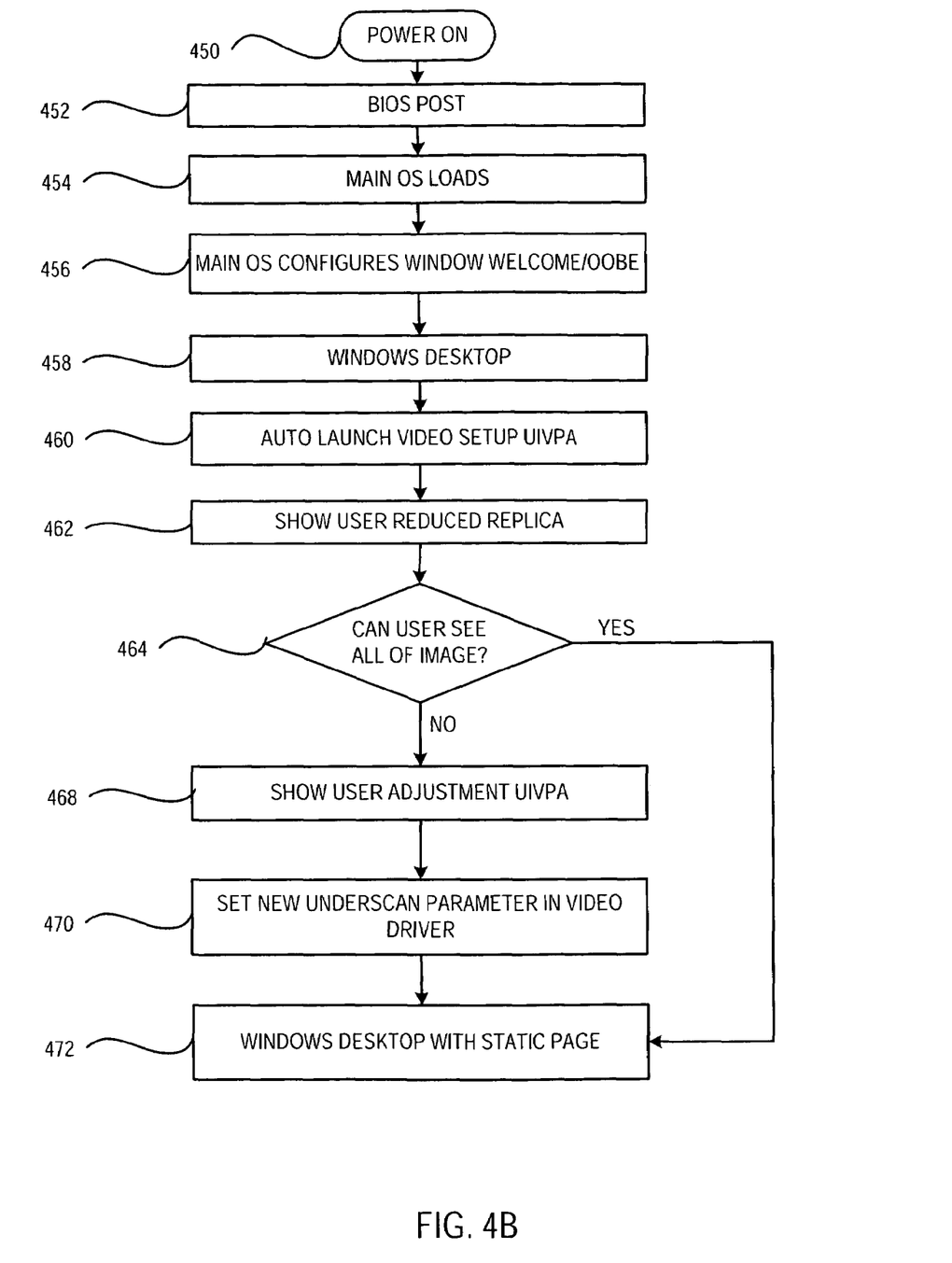
FIG. 4B shows, in an embodiment of the present invention, a flowchart illustrating the steps of acquiring user inputs through a UIVPA arrangement after the initial loading of the main operating system.

FIG. 4B shows, in accordance with an alternative embodiment of the present invention, a flowchart illustrating the steps of acquiring user inputs through a UIVPA arrangement after the initial loading of the main operating system. In FIG. 4B, the UIVPA arrangement is auto-launched after the loading of the main OS. After an image-generating electronic device and a television set have been connected and powered on (step 450), the BIOS proceeds as normal (step 452) to load the main operating system and the video driver (step 454). After the operating system has been loaded, the main operating system configures the window welcome screen as part of the OOBE (step 456). Subsequently, the user is shown a window desktop in step 458.

In an embodiment, the video setup UIVPA is automatically launched (step 460) after the window desktop appears to lead the user through the process of correcting any over-scanning that may have occurred. The user is provided with a reduced replica image (step 462) from which the user is able to compare the reduced replica image against the viewable test image (which may represent, in an embodiment, the desktop image).

If the user can see the entire test image, then the UIVPA is closed and the window desktop takes over (step 472). On the other hand, if the user cannot see the entire test image, then the UIVPA user interface solicits the user for an adjustment value that corrects for the over-scan (468). The adjustment value entered at step 468 is saved and used by the video driver for subsequent image display (step 470). Thereafter, control is passed to the Windows desktop (step 472).

As can be appreciated from the embodiments of the invention, a simple and efficient mechanism is provided to enable the user to correct for over-scanning. With the provide UIVPA arrangement, the user is able to adjust, via a user-friendly and highly intuitive interface, the image displayed by the image-generating electronic device on a television set. The UIVPA tool is provided, automatically if desired and/or appropriate, to enable even one unfamiliar with display technologies and/or OS technical details and/or computer system technical details to perform the adjustment for over-scanning.

Since the adjustment is made based on observations made by the user and adjustment values inputted by the user, it is irrelevant whether the computer system has any information pertaining to the connected television set. In other words, even if the computer system does not have any information pertaining to the make, model, display properties, and/or any other details pertaining to the television set, adjustment may still be made by the user via the provided UIVPA. To further improve user-friendliness, various embodiments propose various potential timing and setup scenarios for launching the UIVPA with respect to the loading of the main OS. Accordingly, the user may be able to adjust, using the highly intuitive and user-friendly UIVPA tool, for over-scanning before, during, or even after main OS loading.

While this invention has been described in terms of several embodiments, there are alterations, permutations, and equivalents, which fall within the scope of this invention. For example, although the examples herein are discussed with reference mainly to the Windows™ operating system platform, the invention is not limited to any particular operating system platform. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for adjusting images displayed on a television set, said television set being coupled to receive image information from an image-generating electronic device, comprising:

a) displaying on said television set, using test image information from said image-generating electronic device, a test image, wherein said test image information is configured to provide edge details disposed near edges of said test image, said edge details being at least partially hidden from view if said image is over-scanned by said television set;

b) receiving, from a human operator, user input;

c) employing said user input to form scaled test image information that corresponds to a scaled test image, said scaled test image representing a scaled version of said test image; and d) displaying on said television set, using said scaled test image information, said scaled test image on said television set in lieu of said test image.

2. The method of claim 1 further comprising repeating steps b), c) and d) until said human operator inputs a first user input that indicates that image adjustment is complete.

3. The method of claim 2 wherein said user input that is employed to create the last scaled test image prior to said first user input being entered is employed for scaling future images prior to displaying said future images on said television set.

4. The method of claim 1 wherein said displaying said test image is performed automatically by said image-generating electronic device without user prompting.

5. The method of claim 4 wherein said scaled test image is smaller than said test image.

6. The method of claim 4 wherein said image-generating electronic device is controlled by a first operating system, said employing said user input to form said scaled test image information is performed prior to said first operating system being booted up on said image-generating electronic device.

7. The method of claim 6 wherein at least a portion of instructions for implementing said employing said user input to form said scaled test image information is a part of a BIOS (basic input/output system) code of said image-generating electronic device.

8. The method of claim 4 wherein said image-generating electronic device is controlled by a first operating system, at least a portion of instructions for implementing said employing said user input to form said scaled test image information is a part of operating system code of said first operating system, said employing said user input to form said scaled test image information as part of a procedure for booting said first operating system on said image-generating electronic device.

9. The method of claim 4 wherein said image-generating electronic device is controlled by a first operating system, said employing said user input to form said scaled test image information is executed under control of a second operating system that is booted up prior to booting said first operating system on said image-generating electronic device.

10. The method of claim 4 wherein said image-generating electronic device is controlled by a first operating system, said employing said user input to form said scaled test image information is executed after said first operating system on said image-generating electronic device is booted up on said image-generating electronic device.

11. The method of claim 10 wherein said first operating system is based on the Microsoft Windows platform, said test image representing at least a portion of a wallpaper image.

12. The method of claim 4 wherein said television set represents a HDTV television set.

13. The method of claim 4 wherein said HDTV television set implements one of a 480i, a 480p, a 720p, and a 1080i standards.

14. The method of claim 1 wherein said test image includes a reduced replica image of said test image, said reduced replica image being positioned so as to remain visible on said television set irrespective whether over-scanning by said television set occurs.

15. An article of manufacture comprising a program storage medium having computer readable code embodied therein, said computer readable code being configured for adjusting images displayed on a television set that is coupled to receive image information from an image-generating electronic device, comprising:

computer readable code for displaying on said television set, using test image information from said image-generating electronic device, a test image, wherein said test image, information is configured to provide edge details disposed near edges of said test image, said edge details being at least partially hidden from view if said image is over-scanned by said television set;

computer readable code for receiving, from a human operator, user input;

computer readable code for employing said user input to form scaled test image information that corresponds to a scaled test image, said scaled test image representing a scaled version of said test image; and computer readable code for displaying on said television set, using said scaled test image information, said scaled test image on said television set in lieu of said test image.

16. The article of manufacture of claim 15 further comprising computer readable code for employing said user input that is employed to create the last scaled test image prior to said first user input being entered is employed to scale future images prior to displaying said future images on said television set.

17. The article of manufacture of claim 15 wherein said displaying said test image is performed automatically by said image-generating electronic device without user prompting.

18. The article of manufacture of claim 15 wherein said image-generating electronic device is controlled by a first operating system, said employing said user input to form said scaled test image information is performed prior to said first operating system being booted up on said image-generating electronic device.

19. The article of manufacture of claim 18 wherein at least a portion of instructions for implementing said employing said user input to form said scaled test image information is a part of a BIOS (basic input/output system) code of said image-generating electronic device.

20. The article of manufacture of claim 15 wherein said image-generating electronic device is controlled by a first operating system, at least a portion of instructions for implementing said employing said user input to form said scaled test image information is a part of operating system code of said first operating system, said employing said user input to form said scaled test image information as part of a procedure for booting said first operating system on said image-generating electronic device.

21. The article of manufacture of claim 15 wherein said image-generating electronic device is controlled by a first operating system, said employing said user input to form said scaled test image information is executed under control of a second operating system that is booted up prior to booting said first operating system on said image-generating electronic device.

22. The article of manufacture of claim 15 wherein said image-generating electronic device is controlled by a first operating system, said employing said user input to form said scaled test image information is executed after said first operating system on said image-generating electronic device is booted up on said image-generating electronic device.

23. The article of manufacture of claim 15 wherein said test image includes a reduced replica image of said test image.

24. The article of manufacture of claim 15 wherein said reduced replica image is configured to be displayed in a display zone of said television set.

25. An arrangement for adjusting images displayed on a television set, said television set being coupled to receive image information from an image-generating electronic device, comprising:

means for generating test image information, said test image information being configured for display on said television set as a test image, wherein said test image information is configured to provide edge details disposed near edges of said test image, said edge details being at least partially hidden from view if said image is over-scanned by said television set;

means for receiving, from a human operator, user input;

means for employing said user input to form scaled test image information that corresponds to a scaled test image, said scaled test image representing a scaled version of said test image; and means for generating scaled test image information, said scaled test information being configured for display on said television set as said scaled test image in lieu of said test image.

26. The arrangement of claim 25 wherein said test image is displayed automatically on said television set without user prompting.

27. The method of claim 25 wherein said image-generating electronic device is controlled by a first operating system, said test image is displayed on said television set prior to said first operating system is booted up on said image-generating electronic device.

28. The method of claim 25 wherein said image-generating electronic device is controlled by a first operating system, said test image is displayed on said television set as part of a boot-up sequence of said first operating system on said image-generating electronic device.

29. The method of claim 27 wherein said image-generating electronic device is controlled by a first operating system, said test image is displayed on said television set after said first operating system is booted up on said image-generating electronic device.

* * * * *

UNITED STATES PATENT AND TRADEMARK OFFICE
CERTIFICATE OF CORRECTION

PATENT NO. : 7,489,336 B2 Page 1 of 1
APPLICATION NO. : 11/173778
DATED : February 10, 2009
INVENTOR(S) : Ruth Ann Lim It is certified that error appears in the above-identified patent and that said Letters Patent is hereby corrected as shown below:

In column 5, line 31, delete "a 480i, a 720i" and insert -- a 480p, a 720p --, therefor.

In column 13, line 12, in Claim 4, delete "claim I" and insert -- claim 1 -- , therefor.

In column 14, line 2, in Claim 15, after "image" delete ",".

In column 16, line 11, in Claim 29, delete "claim 27" and insert -- claim 25 --, therefor.

Signed and Sealed this

Twenty-sixth Day of May, 2009

JOHN DOLL
*Acting Director of the United States Patent and Trademark Office*